July 16, 1968  G. ROSA  3,392,664

STEAK GRILL WITH REVERSIBLE GAS-HEATED HOT PLATE

Filed Sept. 21, 1965  2 Sheets-Sheet 1

INVENTOR.
G. Rosa
BY
Richards & Geier
ATTORNEYS

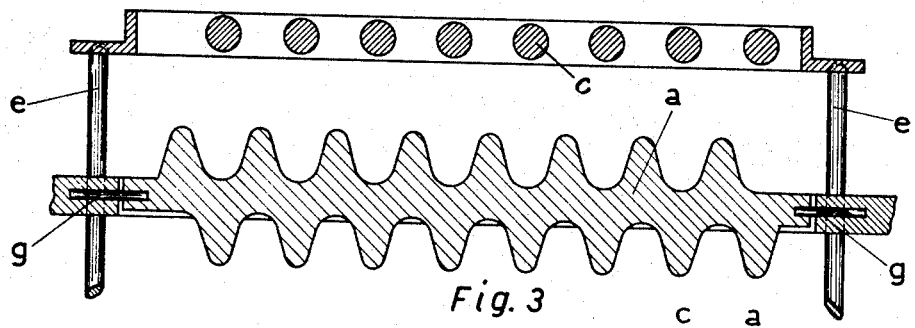
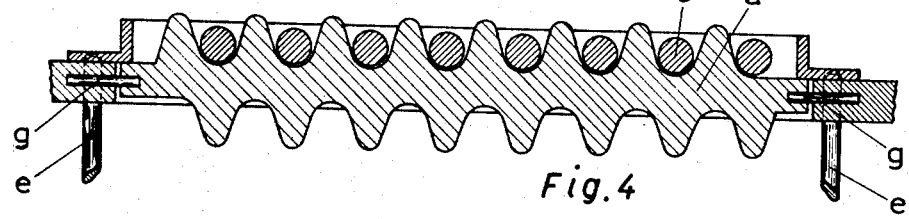
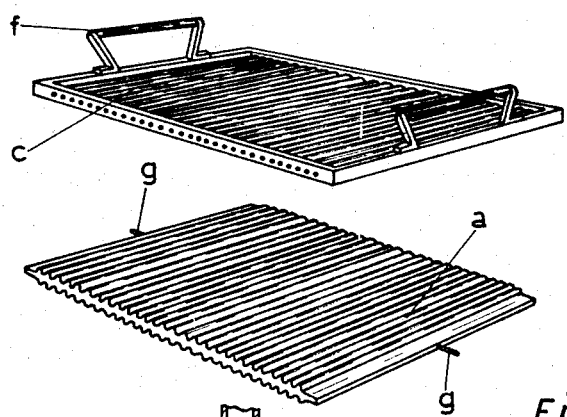
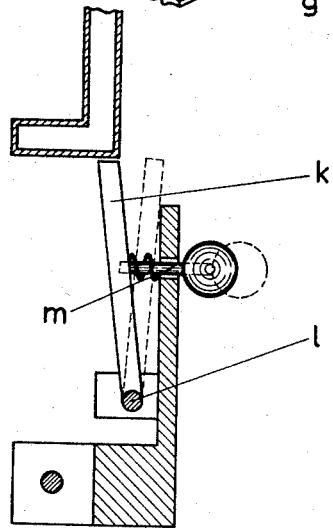

United States Patent Office 3,392,664
Patented July 16, 1968

3,392,664
STEAK GRILL WITH REVERSIBLE
GAS-HEATED HOT PLATE
Giuseppe Rosa, Corso Garibaldi 75,
Thiene, Vicenza, Italy
Filed Sept. 21, 1965, Ser. No. 488,999
Claims priority, application Italy, Dec. 10, 1964,
26,771/64
5 Claims. (Cl. 99—423)

ABSTRACT OF THE DISCLOSURE

A steak grill with a reversible hot plate heated by a gas burner and provided with transverse ribs which also includes a grid located above the hot plate and movable relatively thereto with the rods of the grid adapted to fit between the ribs.

---

The present invention concerns a grill for grilling steak, fish or the like food, provided with a reversible hot plate, heated by gas, operating on both its surfaces, and an upwardly displaceable grid for the purpose of controlling the cooking temperature.

As is well known, in the case of food grills used hitherto, one of the greatest disadvantages is due to the fact that the residues, resulting from contact with food and cooking oil, produce incrustations which make it necessary to clean the plate frequently, which results in a great waste of labour.

This cleaning is indispensable, because it is necessary to prevent the food which is being cooked, absorbing fumes due to the incrustations present on the plate, which is a very harmful matter when the type of food being cooked is changed, for example, from meat to fish and vice versa.

The incrustations also cause a deterioration in the conduction of heat, and consequent lowering of the cooking temperature.

A further disadvantage of the steak grills in use at present is due to the fact that the food being cooked, particularly if of considerable thickness, is not uniformly cooked, requiring continuous regulation of the heat.

However, by the use of the present invention, the radiant plate can easily be reversed, permitting perfect cleaning of the incrustations from the lower surface by direct combustion with the flame, whilst cooking of the food is continued on the other surface.

The possibility of upward displacement of the grid also permits perfect control of the heating temperature without having to modify the intensity of the flame and the temperature of the plate.

The further possibility of lowering the food grid below the tops of the ribs of the plate makes it possible to rest the food directly on the plate in the initial cooking stage, producing an initial superficial cooking of the food for the purpose of avoiding its adhesion to the grid.

Said grid, initially heated by direct contact with the plate, is then raised to continue the cooking of the food at a predetermined level controllable relatively to the hot plate.

The cooking oil is recovered from the steak grill of the present invention by means of a displaceable drip collector located to correspond with the end of the hot plate which, to facilitate such recovery, is slightly inclined.

The arrangement of the gas flame under the hot plate makes it possible to remove the combustion products through a separate conduit without contaminating the food being cooked.

This arrangement also makes it possible to obtain a forced draught of the fumes and odours from the food through the chimney.

The invention will be described further, by way of example, with reference to the accompanying drawings, in which:

FIG. 3 is a schematic cross section through the hot plate, with the grid raised;

FIG. 4 is a similar view with the grid in the lowered position;

FIG. 5 is a perspective view of the plate and grid separated from each other; and FIG. 6 is a detail of the mechanism for releasing the burner framework.

Figure 1:
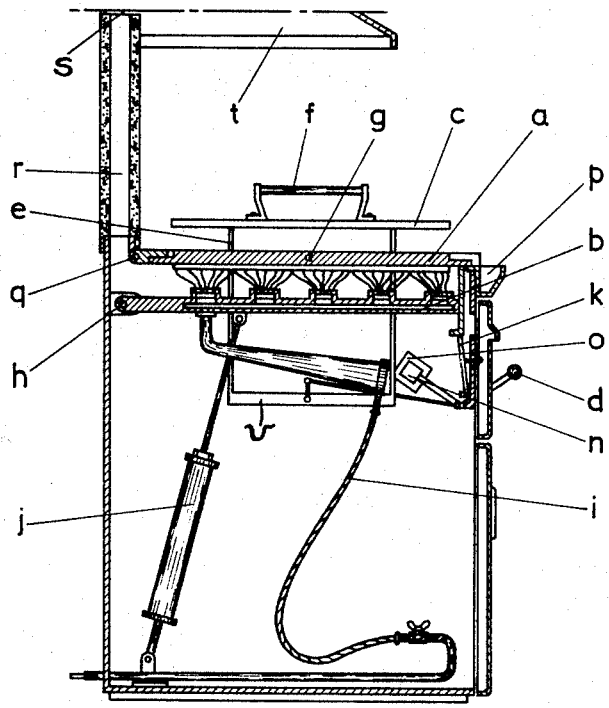
FIG. 1 is a complete vertical section through the steak grill of the present invention, in its position of use.

The steak grill of the present invention comprises a hot plate $a$ (FIG. 1) heated from below by burners $b$ is surmounted by a grid $c$ on which the food to be cooked is located.

The grid $c$ may be raised or lowered by operating a lever $d$ which acts on the grid $c$ by means of rods $e$.

The grid $c$ simply rests on the rods $e$ and can be readily removed, holding it by a handle $f$.

The hot plate $a$ is rotatable at $g$ on two central supporting pivots.

Figure 2:
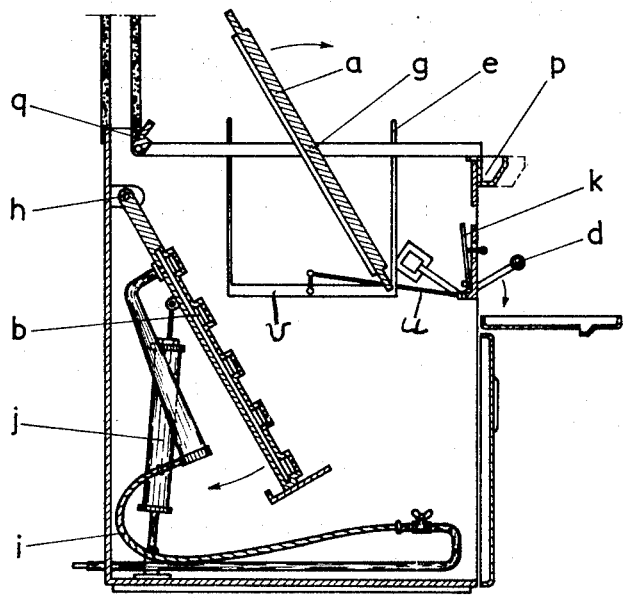
FIG. 2 is a partial view thereof during the operation of reversing the plate.

It may be rotated until it is upside down, when the grid $c$ is removed and the burner frame lowered, rotatable at $h$, as shown in FIG. 2.

Such an operation may be effected with the burner alight. The burner may be raised by hand, engaging it by an ordinary stove hook.

The burner unit $b$ is fed by a flexible tube $i$ and its descent is braked by a shock absorber $j$, for example, of the pneumatic cylinder type.

The burner $b$ is kept in the raised position by a spindle $k$ on which it rests.

The spindle $k$ is rotatable at $l$ (FIG. 6) and may be displaced by means of a lever $m$ provided with control knobs, overcoming the action of a spring.

The hot plate $a$ (FIG. 3) is provided on both surfaces with transverse channels into which project the rods of the grid $c$ (FIG. 4) when the latter is in the lowered position.

The rods $c$ are rotatable on their supporting frame to permit easy cleaning.

In the lowered position of the grid $c$, the food comes into direct contact with the summits of the ribs of the hot plate $a$, thus undergoing rapid superficial heating in the initial cooking phase.

When beef steaks are being cooked, they therefore acquire the characteristic brown streaks which characterise grilling.

Immediately afterwards, however, the grid is raised by means of the lever $d$ (FIG. 1), to permit cooking to be continued at a more moderate temperature and more uniform heating which penetrates in depth.

The grid $c$ is raised by moving upwardly the rods $e$ which support it. The rods $e$ are moved upwardly by swinging downwardly the lever $d$, as shown in FIG. 2. The lever $d$ is connected with an arm $u$ which is pivotally connected with the transverse support $v$ of the vertical rods $e$. Thus a downward swinging of the lever $d$ will result in an upward swinging of the arm $u$ and an upward movement of the support $v$ and of the rods $e$ carrying the grid $c$.

The grid $c$ remains fixed in the desired position by the effect of the operation of the slide $n$ (FIG. 1) connected to the lever $d$, on the plate $o$.

The plate $a$ is provided on its opposite surface with ribs similar to the preceding ones, but relatively displaced thereto, to make the thickness of the plate more uniform for the purpose of obtaining uniform transmission of heat.

The plate $a$ is rotatable on its pivots $g$ so that it can be reversed when it is intended to effect thorough cleaning of the ribs on one surface; in fact all the incrustations are thus completely burnt off by the flames of the burner below it, whilst the cooking operation may be continued on the opposite surface of the plate.

The drip collector $p$ (FIG. 1) supported at the side by tabs inserted in the hold formed in the outer frame of the apparatus, collects any oil which is left over flowing away in the channels in the hot plate $a$, which oil may be recovered in such manner.

The flap $q$, which rests, in its operative position, on the rear edge of the plate, prevents the discharge of the combustion products through the gap which would be formed between the plate and the fixed outer frame of the apparatus, compelling them to rise through the rectangular discharge tube $r$.

It is possible to place the sensitive bulb of a thermostat on the flap $q$ to check the temperature of the plate.

The escape of the gases through the discharge tube $s$ causes a forced draught to correspond with the chimney $t$ facilitating the expulsion of fumes and odours from the food which is being cooked.

What I claim is:

1. A steak grill comprising a hot plate, pivots swingably supporting said hot plate, said hot plate having transverse ribs, a gas burner unit located under said hot plate for heating the hot plate, a food grid located above said hot plate and having rods adapted to fit between said ribs, and means moving said food grid up and down relatively to said hot plate, said hot plate further having grooves on opposite surfaces thereof, thus making it possible to effect perfect cleaning of the incrustations present on the surface in contact with the flame, whilst grilling is continued on the opposite surface.

2. A steak grill as claimed in claim 1, in which the burner unit is rotatable on pivots disposed at its rear end being capable in such manner of being lowered even when alight, to permit the reversal of the hot plate.

3. A steak grill as claimed in claim 1, wherein said means comprise a slide which is displaceable on a fixed plate, with friction, the slide being connected to a control lever for raising the said displaceable grid.

4. A steak grill as claimed in claim 1, in which the products of combustion from the burner flames escape through a suitable duct located to the rear of the steak grill without coming into contact with the food being grilled.

5. A steak grill as claimed in claim 4, in which the duct for the discharge of the combustion gases ends immediately in front of the outlet of the chimney located above the steak grill, generating in such manner a forced draught which facilitates the intake of the discharge gases and the odours from the food being grilled.

References Cited

UNITED STATES PATENTS

| | | | |
|---|---|---|---|
| 1,090,924 | 3/1914 | Lawrence | 99—425 X |
| 1,373,788 | 4/1921 | Ball | 99—425 |
| 2,432,792 | 12/1947 | Ovenshire | 99—422 X |
| 2,856,502 | 10/1958 | Wolf | 99—445 X |
| 3,090,373 | 5/1963 | Yagley et al. | 124—41 |

FOREIGN PATENTS

| | | |
|---|---|---|
| 1,165,241 | 5/1958 | France. |
| 1,275,109 | 9/1961 | France. |

WALTER A. SCHEEL, *Primary Examiner.*

J. M. NEARY, S. P. FISHER, *Assistant Examiners.*